United States Patent
Mahgerefteh et al.

(10) Patent No.: US 7,663,762 B2
(45) Date of Patent: Feb. 16, 2010

(54) HIGH-SPEED TRANSMISSION SYSTEM COMPRISING A COUPLED MULTI-CAVITY OPTICAL DISCRIMINATOR

(75) Inventors: Daniel Mahgerefteh, Los Angeles, CA (US); Parviz Tayebati, Weston, MA (US)

(73) Assignee: Finisar Corporation, Sunnyvale, CA (US)

( * ) Notice: Subject to any disclaimer, the term of this patent is extended or adjusted under 35 U.S.C. 154(b) by 348 days.

(21) Appl. No.: 10/308,522

(22) Filed: Dec. 3, 2002

(65) Prior Publication Data
US 2004/0008933 A1    Jan. 15, 2004

Related U.S. Application Data

(60) Provisional application No. 60/395,161, filed on Jul. 9, 2002, provisional application No. 60/401,419, filed on Aug. 6, 2002.

(51) Int. Cl.
*G01B 9/02* (2006.01)
(52) U.S. Cl. .................................... 356/454
(58) Field of Classification Search ................ 317/100; 398/37, 159, 187; 385/27; 427/569, 8, 307; 435/4, 6–7
See application file for complete search history.

(56) References Cited

U.S. PATENT DOCUMENTS

| | | | |
|---|---|---|---|
| 3,324,295 A | 6/1967 | Harris | |
| 3,999,105 A * | 12/1976 | Archey et al. | ............... 361/700 |
| 4,038,600 A | 7/1977 | Thomas et al. | |
| 4,561,119 A | 12/1985 | Epworth | |
| 4,805,235 A | 2/1989 | Henmi | |
| 4,841,519 A | 6/1989 | Nishio | |
| 5,293,545 A | 3/1994 | Huber | |
| 5,325,378 A | 6/1994 | Zorabedian | |
| 5,371,625 A | 12/1994 | Wedding et al. | |
| 5,412,474 A | 5/1995 | Reasenberg et al. | |
| 5,416,629 A | 5/1995 | Huber | |
| 5,465,264 A | 11/1995 | Buhler et al. | |
| 5,477,368 A | 12/1995 | Eskildsen et al. | |
| 5,550,667 A | 8/1996 | Krimmel et al. | |
| 5,592,327 A | 1/1997 | Gabl et al. | |

(Continued)

FOREIGN PATENT DOCUMENTS

GB            2107147 A        4/1983

(Continued)

OTHER PUBLICATIONS

Lee, Chang-Hee et al., Transmission of Directly Modulated 2.5-Gb/s Signals Over 250-km of Nondispersion-Shifted Fiber by Using a Spectral Filtering Method, IEEE Photonics Technology Letters, Dec. 1996, 1725-1727, vol. 8, No. 12.

(Continued)

*Primary Examiner*—Charles D Garber
*Assistant Examiner*—Andre' C Stevenson
(74) *Attorney, Agent, or Firm*—Workman Nydegger

(57) ABSTRACT

This invention generally relates to an optical filter for a fiber optic communication system. A coupled multi-cavity optical filter may be used, following a directly modulated laser source, and converts a partially frequency modulated signal into a substantially amplitude modulated signal. The optical filter may compensate for the dispersion in the fiber optic transmission medium and may also lock the wavelength of the laser source.

41 Claims, 13 Drawing Sheets

U.S. PATENT DOCUMENTS

| | | | |
|---|---|---|---|
| 5,737,104 A | 4/1998 | Lee et al. | |
| 5,777,773 A | 7/1998 | Epworth et al. | |
| 5,805,235 A | 9/1998 | Bedard | |
| 5,856,980 A | 1/1999 | Doyle et al. | |
| 5,920,416 A | 7/1999 | Beylat et al. | |
| 5,953,139 A * | 9/1999 | Nemecek et al. | 398/79 |
| 5,953,361 A | 9/1999 | Borchert et al. | |
| 5,974,209 A | 10/1999 | Cho et al. | |
| 6,081,361 A | 6/2000 | Adams et al. | |
| 6,096,496 A * | 8/2000 | Frankel | 506/31 |
| 6,104,851 A | 8/2000 | Mahgerefteh | |
| 6,115,403 A | 9/2000 | Brenner et al. | |
| 6,222,861 B1 | 4/2001 | Kuo et al. | |
| 6,271,959 B1 | 8/2001 | Kim et al. | |
| 6,298,186 B1 | 10/2001 | He | |
| 6,331,991 B1 | 12/2001 | Mahgerefteh | |
| 6,353,623 B1 | 3/2002 | Munks et al. | |
| 6,359,716 B1 | 3/2002 | Taylor | |
| 6,421,151 B1 | 7/2002 | Berger et al. | |
| 6,473,214 B1 * | 10/2002 | Roberts et al. | 398/183 |
| 6,506,342 B1 * | 1/2003 | Frankel | 506/31 |
| 6,563,623 B1 | 5/2003 | Penninckx et al. | |
| 6,577,013 B1 * | 6/2003 | Glenn et al. | 257/777 |
| 6,618,513 B2 | 9/2003 | Evankow, Jr. | |
| 6,650,667 B2 | 11/2003 | Nasu et al. | |
| 6,654,564 B1 * | 11/2003 | Colbourne et al. | 398/147 |
| 6,658,031 B2 | 12/2003 | Tuganov et al. | |
| 6,665,351 B2 | 12/2003 | Hedberg et al. | |
| 6,687,278 B1 | 2/2004 | Mason et al. | |
| 6,748,133 B2 | 6/2004 | Liu et al. | |
| 6,778,307 B2 | 8/2004 | Clark | |
| 6,810,047 B2 | 10/2004 | Oh et al. | |
| 6,834,134 B2 | 12/2004 | Brennan et al. | |
| 6,836,487 B1 | 12/2004 | Farmer et al. | |
| 6,847,758 B1 | 1/2005 | Watanabe | |
| 6,943,951 B2 | 9/2005 | Kikuchi et al. | |
| 6,947,206 B2 | 9/2005 | Tsadka et al. | |
| 6,963,685 B2 | 11/2005 | Mahgerefteh et al. | |
| 7,013,090 B2 | 3/2006 | Adachi et al. | |
| 7,054,538 B2 | 5/2006 | Mahgerefteh et al. | |
| 7,076,170 B2 | 7/2006 | Choa | |
| 7,123,846 B2 | 10/2006 | Tateyama et al. | |
| 7,164,865 B2 | 1/2007 | Tatsuno et al. | |
| 7,263,291 B2 | 8/2007 | Mahgerefteh et al. | |
| 7,280,721 B2 | 10/2007 | McCallion et al. | |
| 7,558,488 B2 | 7/2009 | Matsui et al. | |
| 2002/0044738 A1 | 4/2002 | Jablonski et al. | |
| 2002/0063930 A1 | 5/2002 | Blauvelt | |
| 2002/0131047 A1 * | 9/2002 | Zarrabian et al. | 356/454 |
| 2002/0154372 A1 | 10/2002 | Chung et al. | |
| 2002/0159490 A1 | 10/2002 | Karwacki | |
| 2002/0176659 A1 | 11/2002 | Lei et al. | |
| 2003/0002099 A1 | 1/2003 | Sayyah et al. | |
| 2003/0002120 A1 | 1/2003 | Choa | |
| 2003/0067952 A1 | 4/2003 | Tsukiji et al. | |
| 2003/0099018 A1 | 5/2003 | Singh et al. | |
| 2003/0147114 A1 | 8/2003 | Kang et al. | |
| 2003/0193974 A1 | 10/2003 | Frankel et al. | |
| 2003/0210912 A1 | 11/2003 | Leuthold et al. | |
| 2004/0008933 A1 | 1/2004 | Mahgerefteh et al. | |
| 2004/0008937 A1 | 1/2004 | Mahgerefteh et al. | |
| 2004/0036943 A1 | 2/2004 | Freund et al. | |
| 2004/0076199 A1 | 4/2004 | Wipiejewski et al. | |
| 2004/0081386 A1 | 4/2004 | Morse et al. | |
| 2004/0096221 A1 | 5/2004 | Mahgerefteh et al. | |
| 2004/0218890 A1 | 11/2004 | Mahgerefteh et al. | |
| 2005/0100345 A1 | 5/2005 | Welch et al. | |
| 2005/0111852 A1 | 5/2005 | Mahgerefteh et al. | |
| 2005/0175356 A1 | 8/2005 | McCallion et al. | |
| 2005/0206989 A1 | 9/2005 | Marsh | |
| 2005/0271394 A1 | 12/2005 | Whiteaway et al. | |
| 2005/0286829 A1 | 12/2005 | Mahgerefteh et al. | |
| 2006/0002718 A1 | 1/2006 | Matsui et al. | |
| 2006/0008272 A1 | 1/2006 | Abeles | |
| 2006/0018666 A1 | 1/2006 | Matsui et al. | |
| 2006/0029358 A1 | 2/2006 | Mahgerefteh et al. | |
| 2006/0029396 A1 | 2/2006 | Mahgerefteh et al. | |
| 2006/0029397 A1 | 2/2006 | Mahgerefteh et al. | |
| 2006/0193636 A1 | 8/2006 | Katagiri et al. | |
| 2006/0228120 A9 | 10/2006 | McCallion et al. | |
| 2006/0233556 A1 | 10/2006 | Mahgerefteh et al. | |
| 2006/0274993 A1 | 12/2006 | Mahgerefteh et al. | |
| 2008/0247765 A1 | 10/2008 | Mahgerefteh et al. | |

FOREIGN PATENT DOCUMENTS

| | | |
|---|---|---|
| JP | 62-189832 | 8/1987 |
| JP | 11-031859 | 2/1999 |
| JP | 2000-105313 | 4/2000 |
| JP | 2001-291928 | 10/2001 |
| JP | 2001-320328 | 11/2001 |
| JP | 2002-243935 | 8/2002 |
| JP | 2002-267834 | 9/2002 |
| JP | 2002-267998 | 9/2002 |
| WO | 9905804 | 2/1999 |
| WO | 0104999 | 1/2001 |
| WO | 0117076 A2 | 3/2001 |
| WO | 0118919 A1 | 3/2001 |
| WO | 03005512 | 7/2002 |

OTHER PUBLICATIONS

Corvini, P.J. et al., Computer Simulation of High-Bit-Rate Optical Fiber Transmission Using Single-Frequency Lasers, Journal of Lightwave Technology, Nov. 1987, 1591-1595, vol. LT-5, No. 11.

Matsui, Yasuhiro et al, Chirp-Managed Directly Modulated Laser (CML), IEEE Photonics Technology Letters, Jan. 15, 2006, pp. 385-387, Vol. 18, No. 2.

Nakahara, K. et al, 40-Gb/s Direct Modulation With High Extinction Ratio Operation of 1.3-μm InGaAl As Multiquantum Well Ridge Waveguide Distributed Feedback Lasers, IEEE Photonics Technology Letters, Oct. 1, 2007, pp. 1436-1438, vol. 19 No. 19.

Sato, K. et al, Chirp Characteristics of 40-Gb/s Directly Modulated Distributed-Feedback Laser Diodes, Journal of Lightwave Technology, Nov. 2005, pp. 3790-3797, vol. 23, No. 11.

Alexander et al., Passive Equalization of Semiconductor Diode Laser Frequency Modulation, Journal of Lightwave Technology, Jan. 1989, 11-23, vol. 7, No. 1.

Binder, J. et al., 10 Gbit/s-Dispersion Optimized Transmission at 1.55 um Wavelength on Standard Single Mode Fiber, IEEE Photonics Technology Letters, Apr. 1994, 558-560, vol. 6, No. 4.

Hyryniewicz, J.V., et al., Higher Order Filter Response in Coupled MicroRing Resonators, IEEE Photonics Technology Letters, Mar. 2000, 320-322, vol. 12, No. 3.

Koch, T. L. et al., Nature of Wavelength Chirping in Directly Modulated Semiconductor Lasers, Electronics Letters, Dec. 6, 1984, 1038-1039, vol. 20, No. 25/26.

Kurtzke, C., et al., Impact of Residual Amplitude Modulation on the Performance of Dispersion-Supported and Dispersion-Mediated Nonlinearity-Enhanced Transmission, Electronics Letters, Jun. 9, 1994, 988, vol. 30, No. 12.

Li, Yuan P., et al., Chapter 8: Silicon Optical Bench Waveguide Technology, Optical Fiber Communications, 1997, 319-370, vol. 111B, Lucent Technologies, New York.

Little, Brent E., Advances in Microring Resonators, Integrated Photonics Research Conference 2003.

Mohrdiek, S. et al., 10-Gb/s Standard Fiber Transmission Using Directly Modulated 1.55- um Quantum-Well DFB Lasers, IEEE Photonics Technology Letters, Nov. 1995, 1357-1359, vol. 7, No. 11.

Morton, P.A. et al., "38.5km error free transmission at 10Gbit/s in standard fibre using a low chirp, spectrally filtered, directly modulated 1.55um DFB laser", Electronics Letters, Feb 13, 1997, vol. 33(4).

Prokais, John G., Digital Communications, 2001, 202-207, Fourth Edition, McGraw Hill, New York.

Rasmussen, C.J., et al., Optimum Amplitude and Frequency-Modulation in an Optical Communication System Based on Dispersion Supported Transmission, Electronics Letters, Apr. 27, 1995, 746, vol. 31, No. 9.

Shalom, Hamutal et al., On the Various Time Constants of Wavelength Changes of a DFB Laser Under Direct Modulation, IEEE Journal of Quantum Electronics, Oct. 1998, pp. 1816-1822, vol. 34, No. 10.

Wedding, B., Analysis of fibre transfer function and determination of receiver frequency response for dispersion supported transmission, Electronics Letters, Jan. 6, 1994, 58-59, vol. 30, No. 1.

Wedding, B., et al., 10-Gb/s Optical Transmission up to 253 km Via Standard Single- Mode Fiber Using the Method of Dispersion-Supported Transmission, Journal of Lightwave Technology, Oct. 1994, 1720, Vol. 12, No. 10.

Yu, et al., Optimization of the Frequency Response of a Semiconductor Optical Amplifier Wavelength Converter Using a Fiber Bragg Grating, Journal of Lightwave Technology, Feb. 1999, 308-315, vol. 17, No. 2.

U.S. Appl. No. 11/272,100, filed Oct. 4, 2006, Restriction Requirement.

U.S. Appl. No. 11/272,100, filed Jul. 11, 2007, Office Action.

U.S. Appl. No. 11/272,100, filed Feb. 19, 2008, Office Action.

U.S. Appl. No. 11/272,100, filed Sep. 9, 2008, Notice of Allowance.

U.S. Appl. No. 11/272,100, filed Oct. 24, 2008, Notice of Allowance.

U.S. Appl. No. 10/289,944, filed Jun. 2, 2004, Restriction Requirement.

U.S. Appl. No. 10/289,944, filed Sep. 17, 2004, Notice of Allowance.

U.S. Appl. No. 11/052,945, filed Aug. 29, 2006, Restriction Requirement.

U.S. Appl. No. 11/052,945, filed Apr. 5, 2007, Office Action.

U.S. Appl. No. 12/062,356, filed Oct. 17, 2008, Restriction Requirement.

U.S. Appl. No. 12/062,356, filed Jan. 14, 2009, Office Action.

U.S. Appl. No. 12/062,356, filed Jun. 29, 2009, Notice of Allowance.

U.S. Appl. No. 10/615,218, filed Jul. 27, 2006, Office Action.

U.S. Appl. No. 10/615,218, filed Apr. 17, 2007, Notice of Allowance.

U.S. Appl. No. 11/093,46, files Mar. 3, 2008, Restriction Requirement.

U.S. Appl. No. 11/093,461, filed Jun. 9, 2008, Office Action.

U.S. Appl. No. 11/093,461, filed Nov. 17, 2008, Final Office Action.

U.S. Appl. No. 11/093,461, filed Apr. 6, 2009, Notice of Allowance.

* cited by examiner

HIGH-SPEED TRANSMISSION SYSTEM COMPRISING A COUPLED MULTI-CAVITY OPTICAL DISCRIMINATOR

RELATED APPLICATIONS

This application claims priority to two U.S. provisional applications: (1) U.S. Application No. 60/395,161, filed Jul. 9, 2002; (2) U.S. Application No. 60/401,419, filed Aug. 6, 2002; and U.S. Patent Application entitled "Power Source for a Dispersion Compensation Fiber Optic" filed Nov. 6, 2002, which are hereby incorporated by reference.

BACKGROUND OF THE INVENTION

1. Field of the Invention

This invention generally relates to a high-speed optical transmitter for a fiber optic system using a coupled multi-cavity filter as a discriminator to convert frequency modulated signal to a substantially amplitude modulated signal.

2. General Background

Fiber optic communication systems use a variety of transmitters to convert electrical digital bits of information into optical signals that are sent through optical fibers. On the other end of the optical fiber is a receiver that converts the optical signal to an electrical signal. The transmitters modulate the signals to form bits of is and Os so that information or data may be carried through the optical fiber. There are a variety of transmitters that modulate the signal in different ways. For example, there are directly modulated transmitters and indirectly modulated transmitters. The directly modulated transmitters offer a compact system having large response to modulation and are integrateable; The directly modulated transmitters are also generally less expensive than the externally modulated transmitters, which require an intensity modulator, usually LiNbO3, following the laser.

One of the drawbacks of a directly modulated transmitter, however, is that its output is highly chirped. Chirp is the rapid change in optical frequency or phase that accompanies intensity modulated signal. Chirped pulses become distorted after propagation through tens of km of dispersive optical fiber, increasing system power penalties to unacceptable levels. This has limited the use of directly modulated laser transmitters to applications with limited distances of tens of km at 2.5 Gb/s as described by P. J. Corvini and T. L. Koch, Journal of Lightwave Technology vol. LT-5, no. 11, 1591 (1987). For higher bit rate applications, the use of directly modulated transmitters may be limited to even shorter distances.

An alternative to directly modulating the laser source is using a laser source that produces a partially frequency modulated signal and an optical discriminator as discussed in UK Patent GB2107147A by R. E. Epworth. In this technique, the laser is initially biased to a current level high above threshold. A partial amplitude modulation of the bias current is applied so that the average power output remains high. The partial amplitude modulation also leads to a partial but significant modulation in the frequency of the laser output, synchronous with the power amplitude changes. This partially frequency modulated output may then be applied to a filter, such as a Fabry Perot filter, which is tuned to allow light only at certain frequencies to pass through. This way, a partially frequency modulated signal is converted into a substantially amplitude modulated signal. That is, frequency modulation is converted into amplitude modulation. This conversion increases the extinction ratio of the input signal and further reduces the chirp.

Since Epworth, a number of variations from his technique have been applied to increase the extinction ratio from the signal output of the laser. For example, N. Henmi describes a very similar system in U.S. Pat. No. 4,805,235, also using a free-space interferometer. Huber U.S. Pat. No. 5,416,629, Mahgerefteh U.S. Pat. Ser. No. 6,104,851, and Brenner U.S. Pat. No. 6,115,403 use a fiber Bragg grating discriminator in similar configurations. In the more recent work, it has also been recognized that a frequency-modulated transmitter with a frequency discriminator produces an output with lower chirp, which reduces the pulse distortion upon propagation through a communication fiber. Chirp is a time dependent frequency variation of an optical signal and generally increases the optical bandwidth of a signal beyond the Fourier-transform limit. Chirp can either improve or degrade the optical pulse shape after propagation through a dispersive fiber, depending on the sign and exact nature of the chirp. In the conventional directly modulated laser transmitter, chirp causes severe pulse distortion upon propagation through the optical fiber. This is because the speed of light in the dispersive medium is frequency dependent, frequency variations of pulses may undergo different time delays, and thus the pulse may be distorted. If the propagation distance through the medium is long as in the case of optical fibers, the pulse may be dispersed in time and its width broadened, which has an undesirable effect.

In these systems, the discriminator is operated to increase the extinction ratio of the input signal or to remove some component of the signal in favor of the other. As such, only the amplitude variation of the discriminator has been utilized. In addition, these systems have mainly dealt with lower bit rate applications. At low bit rates, the spectrum of a modulated laser biased above its threshold includes two carriers, each carrying the digital signal used to modulate the laser. The wavelengths of the two peaks are separated by 10 GHz to 20 GHz depending on the laser and the bias. Hence, a variety of optical discriminators, Fabry-Perot, Mach-Zehnder, etc. may be used to resolve the two peaks, generally discarding the 0s bits and keeping the 1s bits, thereby increasing the extinction ratio at the output.

A Fabry-Perot filter is formed by two partially reflecting mirror surfaces, which are separated by a small gap on the order of a few micrometers. The cavity is either an air gap or a solid material formed by deposition or cut and polish method. The transmission of a Fabry-Perot filter consists of periodic peaks in optical frequency separated by the so-called free-spectral range (FSR), which is inversely proportional to the thickness of the gap. The steepness of the peaks is determined by the reflectivity of the two mirrors. However, the steeper the transmission edges, the narrower the pass-band of the filter. As such, Fabry-Perot filter may provide the steeper transmission edges or slope, but it does not provide the broad enough bandwidth for high bit rate applications such as 10 Gb/s.

At higher bit rates, the spectrum of the frequency modulated signal becomes more complicated and the choice of discriminators that may be used is limited. At high bit rates around 10 Gb/s, the information bandwidth becomes comparable to the frequency excursion of the laser, which is typically around 10 GHz. In addition, the transient chirp that arises at the transitions between 1s and 0s broadens to complicate the spectrum further. In order to separate the 1 and 0 bits with the extinction ratio of 10 dB, the slope of the discriminator should be greater than 1 dB/GHz, while passing 10 Gb/s information. Under this performance criteria, a Fabry-Perot filter may not work because the bandwidth and slope characteristics of Fabry-Perot filters are such that the steeper the transmission edges, the narrower the pass-bandwidth of the filter. As illustrated in FIGS. 1A and 1B, a Fabry-Perot discriminator with 1 dB/GHz slope may only have about 3 GHz bandwidth. Such limited bandwidth can severely distort a 10 Gb/s signal such that the FM modulated transmitter with a Fabry-Perot filter may not work at this bit rate. Others have tried Fiber Bragg gratings for high bit rate applications, but fiber gratings are sensitive to temperature and require a separate package with temperature stabilization. Therefore, there still is a need for a compact frequency discriminator that can operate with a FM modulated source at high bit rates such as 10 Gb/s.

BRIEF DESCRIPTION OF THE FIGURES

A detailed description with regard to the embodiments in accordance with the present invention will be made with reference to the accompanying drawings.

SUMMARY OF THE INVENTION

This invention provides a laser transmitter system capable of directly modulating a laser source and partially compensating for the dispersion in the fiber so that the system may be applied to faster bit rate and longer reach applications. This is accomplished by utilizing a coupled multi-cavity (CMC) filter as the discriminator in the laser transmitter system. The CMC filter provides the compactness of the Fabry-Perot filter and has the advantage of operating at high bit rates, such as 10 Gb/s. The CMC filter is capable of operating at high bit rates because the slope of the transmission edge(s) of the CMC is high without narrowing the bandwidth of the transmission region. The CMC filter also offers design flexibility where the amplitude and phase of the CMC filter may be optimized for particular design criteria. In addition, the CMC filter enhances the fidelity of converting frequency modulation (FM) to amplitude modulation (AM) and at least partially compensating for the dispersion in the optical fiber so that the laser source may be directly modulated. The CMC filter may be also adapted to lock the wavelength of a pulse from a laser source as well as converting a partially frequency modulated signal into a substantially amplitude modulated signal.

Many modifications, variations, and combinations of the methods and systems and apparatus of a dispersion compensated optical filter are possible in light of the embodiments described herein. The description above and many other features and attendant advantages of the present invention will become apparent from consideration of the following detailed description when considered in conjunction with the accompanying drawings.

DETAIL DESCRIPTION

Figure 1A:
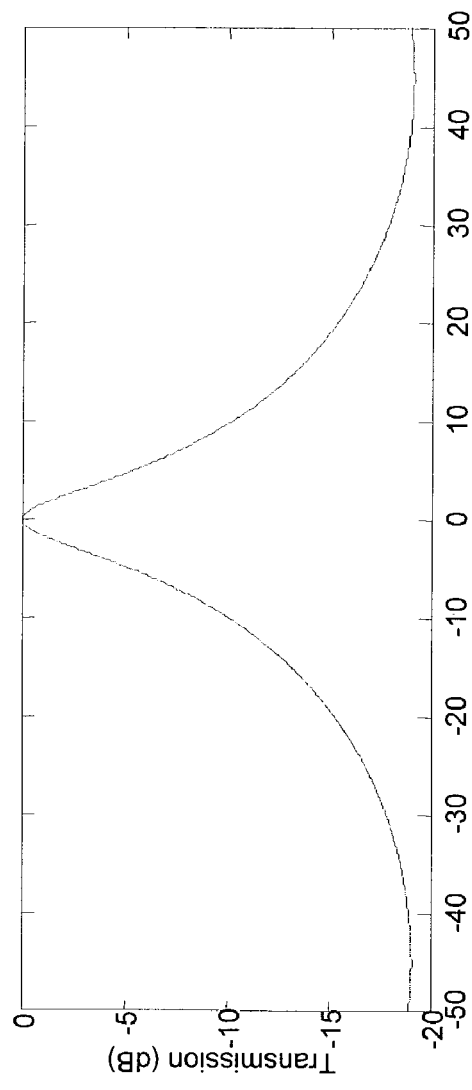
FIG. 1A illustrates a graph with the transmission and dispersion of a Fabry-Perot filter with about 1 dB/GHz discriminator slope.
Figure 1B:
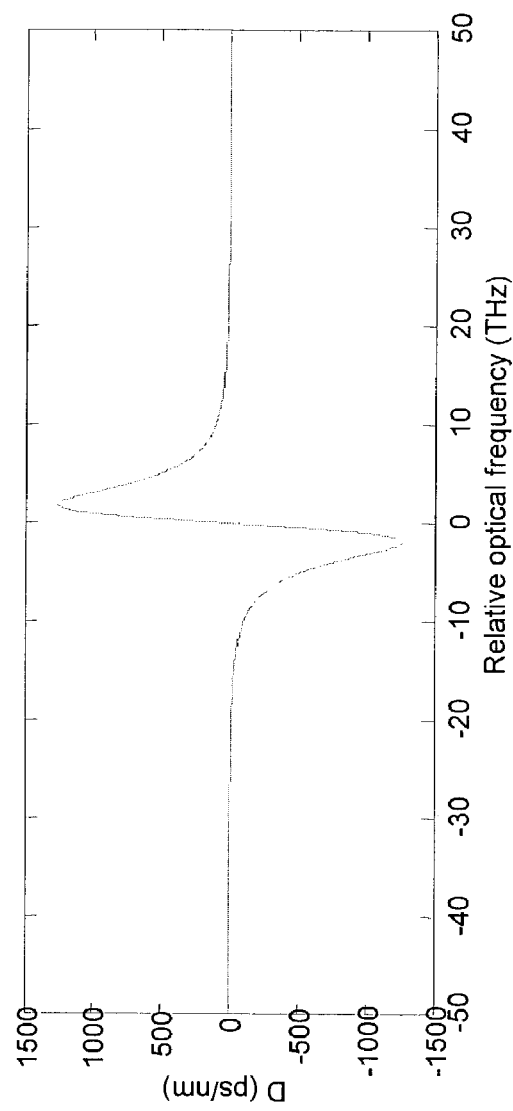
FIG. 1B illustrates the bandwidth of the Fabry-Perot filter of FIG. 1A.
Figure 2:
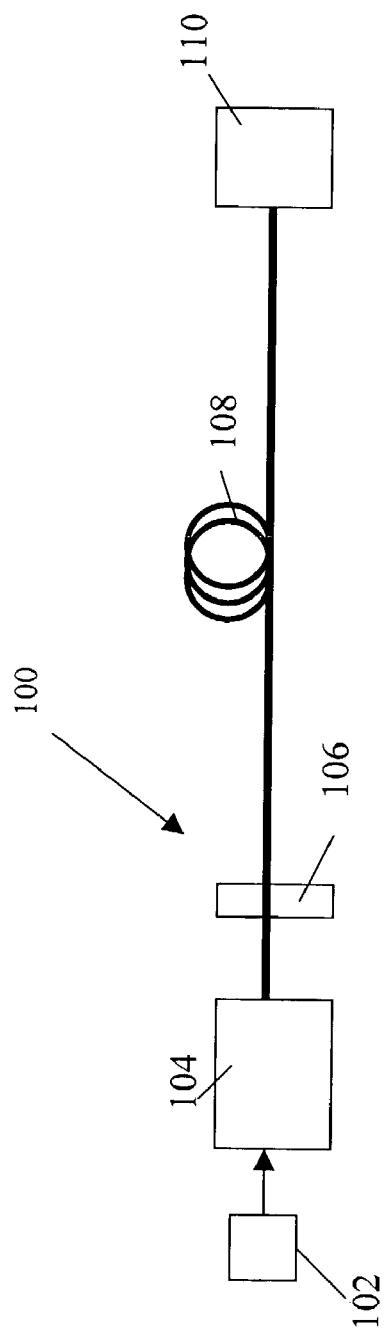
FIG. 2 illustrates a fiber optic system including a directly FM modulated laser, and a transmission type optical discriminator that compensates at least partially for the dispersion of the fiber.

FIG. 2 illustrates a fiber optic system 100 that includes a current modulator 102 that modulates a laser source 104. The current modulator 102 may directly modulate the laser source 104. In this regard, U.S. Pat. No. 6,331,991 by Daniel Mahgereftech, issued Dec. 18, 2001 is hereby incorporated by reference into this application. The laser source 102 may be a variety of different types of lasers such as a semiconductor laser. The laser may be biased high above the threshold and the level of modulation may produce a predetermined extinction ratio, such as about 2 dB to about 7 dB. The signal from the laser may then pass through an optical discriminator 106 with a dispersion $D_{discriminator}$ in ps/nm and the signal from the laser may be passed through one of its transmission edges. The optical discriminator 106 may convert a partially frequency modulated (FM) signal to a substantially amplitude modulated (AM) signal. In this example, the optical discriminator 106 may be a coupled multi-cavity (CMC) filter to enhance the fidelity of the FM to AM conversion as well as introducing enhanced dispersion compensation to achieve longer reach applications. The resulting signal from the optical discriminator 106 is transmitted through a fiber 108 having net dispersion $D_{fiber}$ in ps/nm. The discriminator may have a predetermined dispersion that is the opposite sign of the dispersion in the fiber, e.g., sign ($D_{discriminator}$)=−sign ($D_{fiber}$) so that the dispersion effect on the fiber may be minimized. This way, the optical signal may travel further without the signal being distorted due the dispersion in the fiber. The receiver 110 then detects the signal sent through the fiber 108. When the fiber optic system 100 operates in this way, the frequency discriminator 106 increases the modulation depth of the incoming laser output in the FM to AM conversion, reduces chirp by rejecting part of the spectrum, as well as partially compensating for the dispersion in the fiber.

Figure 3A:
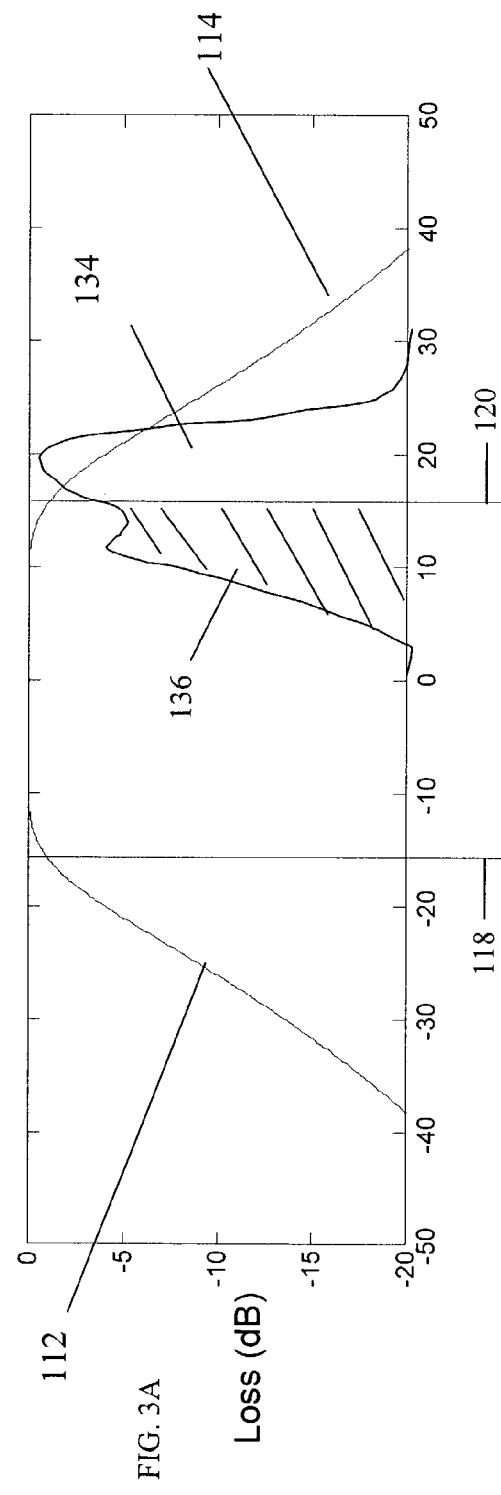
FIG. 3A illustrates optical signals on a negative transmission edges of a coupled multi-cavity (CMC) filter versus an optical frequency.
Figure 3B:
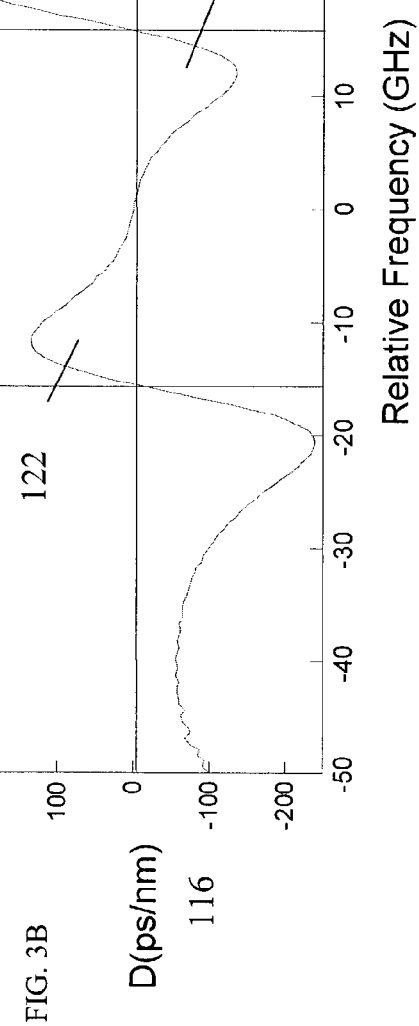
FIG. 3B illustrates corresponding dispersion of the CMC filter in FIG. 3A versus the optical frequency.

The discriminator 106 may modify the phase of the incoming electric field as well as its amplitude. Group velocity dispersion may be defined as:

$$D = -\frac{2\pi c}{\lambda^2}\frac{d^2\phi}{d\omega^2}, \quad (1)$$

where $D_{discriminator}$ is in units of ps/nm that may be positive or negative depending on the filter shape and frequency as illustrated in FIGS. 3A through 3D. In equation (1): $\phi$ is the phase; $\omega$ is frequency; c is the speed of light; and $\lambda$ is wavelength. For D>0, shorter wavelength components of the wave travel faster than the longer components, and for D<0, the opposite is true. The discriminator 106 may be formed by using the transmission edge of a band pass filter. FIG. 3A illustrates two transmission edges having a positive slope 112 on the low frequency side, and a negative slope 114 on the high frequency side. FIG. 3B illustrates that the sign of the dispersion D 116 may be a function of the relative frequency with distinct features having zeros near the filters transmission edges 118 and 120, respectively on the positive slope side 112 and the negative slope side 114. The dispersion D 116 is also substantially positive on the pass band on the low frequency side 122 and substantially negative on the pass band on the high frequency side 124.

Figures 3C, 3D:
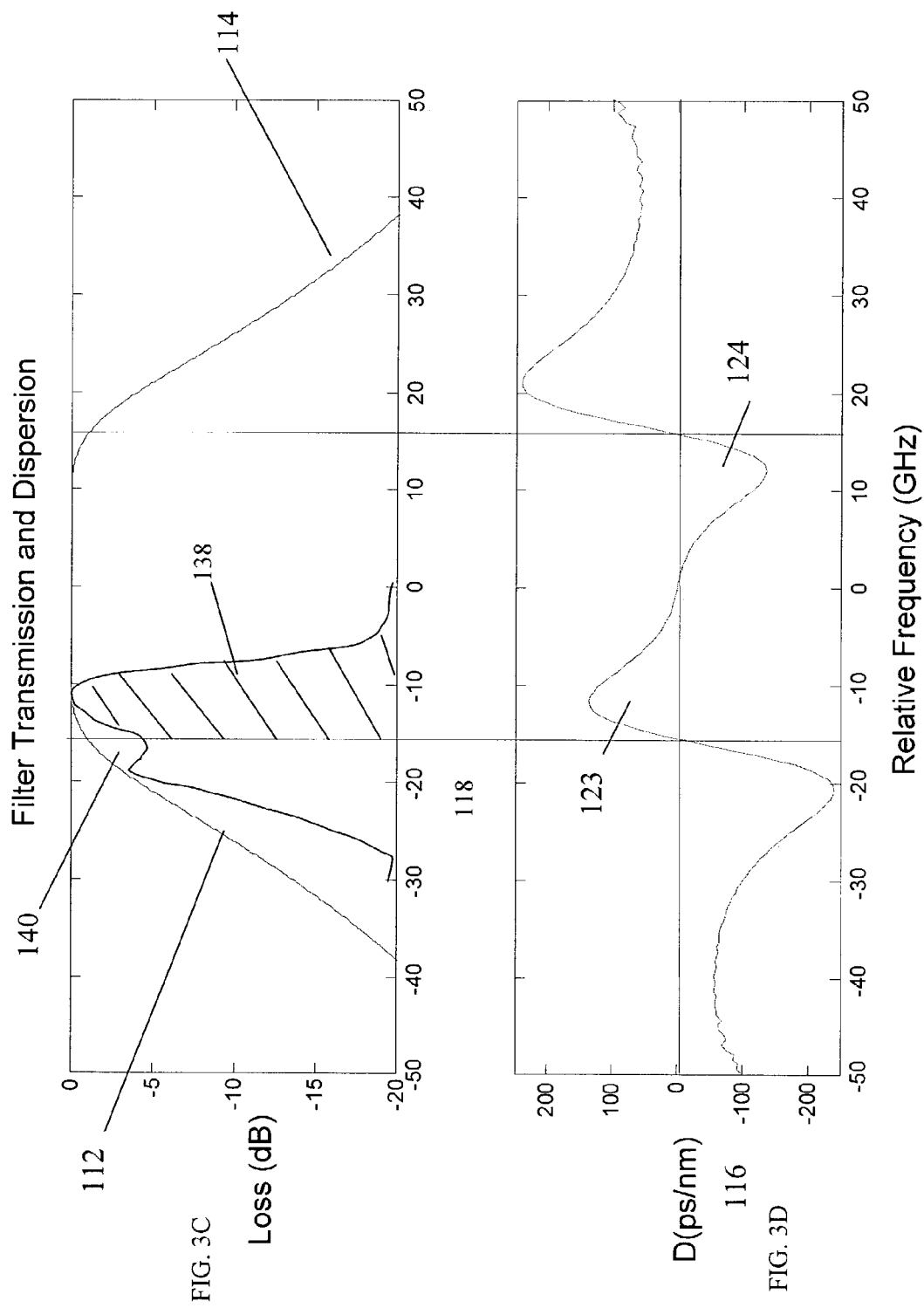
FIG. 3C illustrates optical signals on a positive transmission edges of the CMC filter according to FIG. 3A.
FIG. 3D illustrates corresponding dispersion of the CMC filter in FIG. 3A versus the optical frequency.
Figure 4:
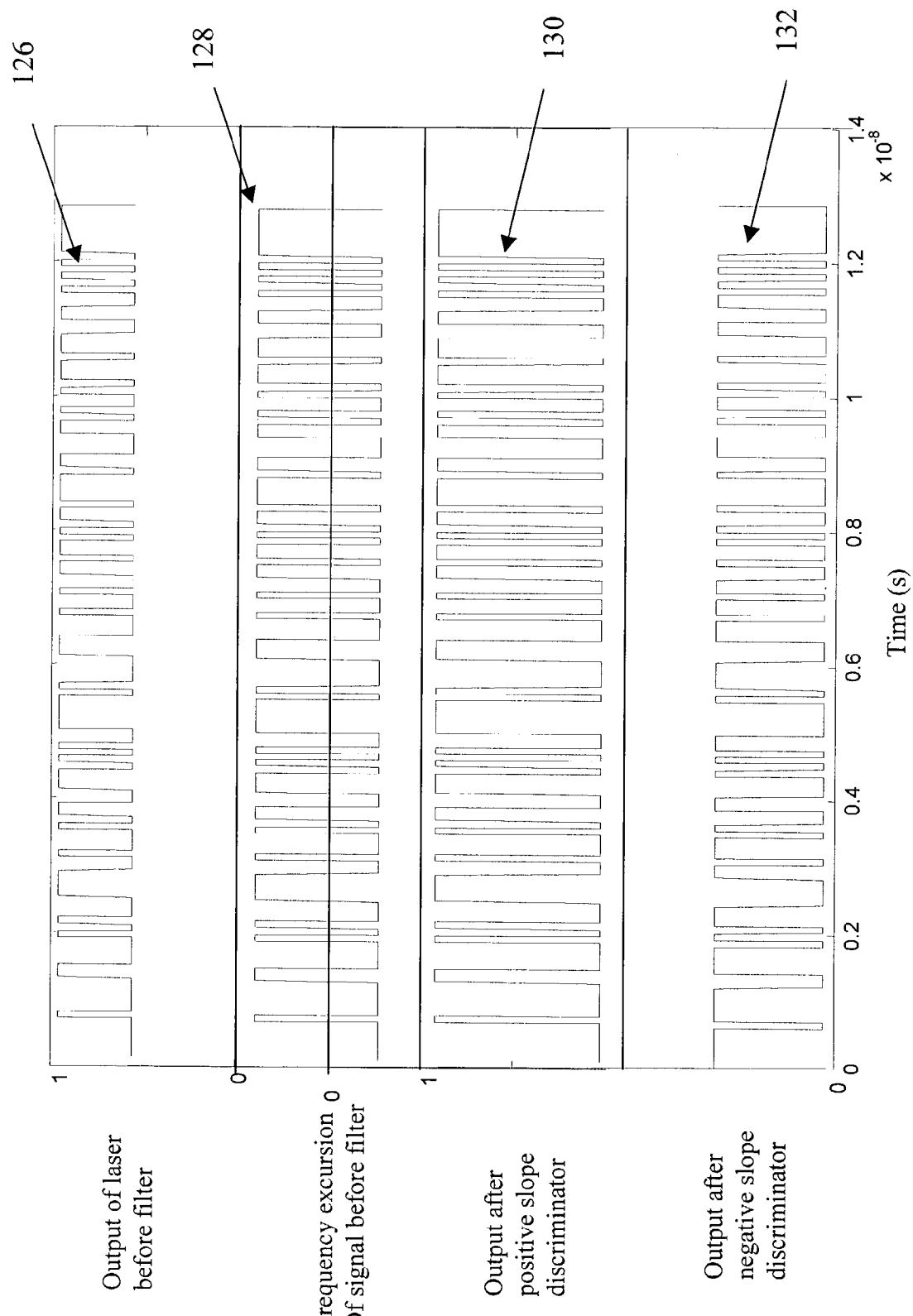
FIG. 4 illustrates output waveforms of transmitter, frequency excursion and output after filters with positive or negative slope.

FIG. 4 illustrates the output power 126 and the frequency excursion 128 of the laser from the laser source 104 but before the discriminator 106. After the laser has been passed through the discriminator 106, the output extinction ratio of the signal 130 is greater than 10 dB for either a positive slope portion 112 or a negative slope portion 114 of the discriminator 106. However, the polarity of the output depends on the sign of the slope of the discriminator used. For a positive slope portion 112, the polarity is the same as the output from the laser source 104, whereas the polarity is opposite for a negative slope portion 114. As such, the negative slope portion 114 of the discriminator 106 may be utilized to at least partially compensate for the dispersion in a fiber having net positive dispersion. As a result of using the negative slope portion 114 of the discriminator 106 as a filter, at least some portion of the positive dispersion effect in the fiber may be neutralized so that the signal through the fiber may travel longer distance without becoming distorted. For example, FIGS. 3A and 3B illustrate a spectral position of an optical signal 134 relative to the discriminator in this configuration. The transmissive portion 136 of the optical signal 134 experiences a negative dispersion 124, hence lowering the so-called fiber dispersion penalty and bit error rate ratio at the receiver. That is, along the optical spectral width over the transmissive portion 136, the dispersion in the discriminator has an opposite sign compared to the dispersion in the fiber. FIGS. 3C and 3D illustrate a discriminator response and the spectral position of the modulated laser signal relative to the filter where a non-inverted output results from the positive slope portion 112 from the discriminator 106. The transmissive portion 138 of the signal 140 experiences a positive dispersion 123, thereby at least partially compensating for fiber having a negative dispersion.

Figure 5:
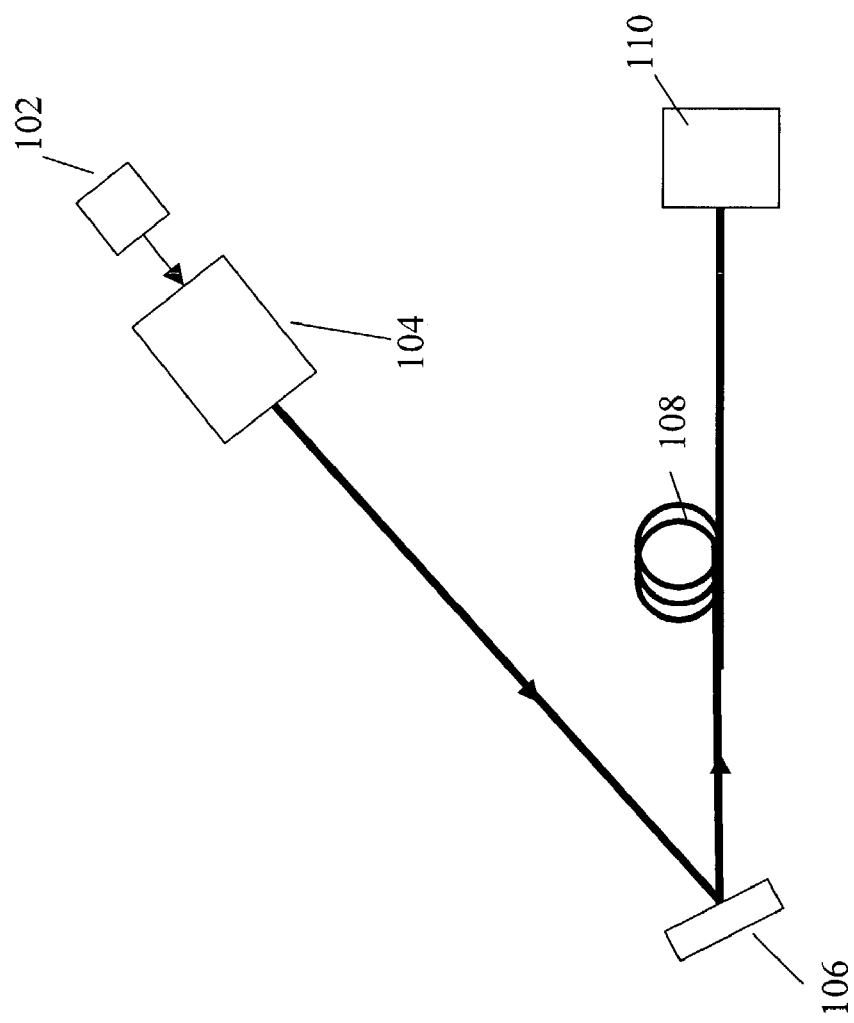
FIG. 5 illustrates a fiber optic system including a directly FM modulated laser, and a reflection type optical discriminator that also compensate partially for the dispersion in the fiber.
Figure 6A:
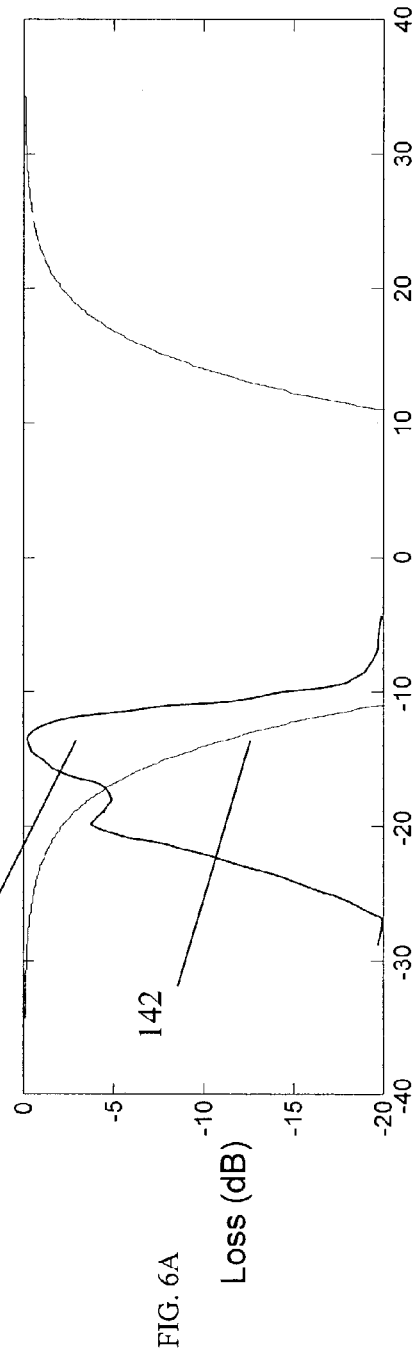
FIG. 6A illustrates optical signals on a negative slope of a reflection side of a CMC filter.
Figure 6B:
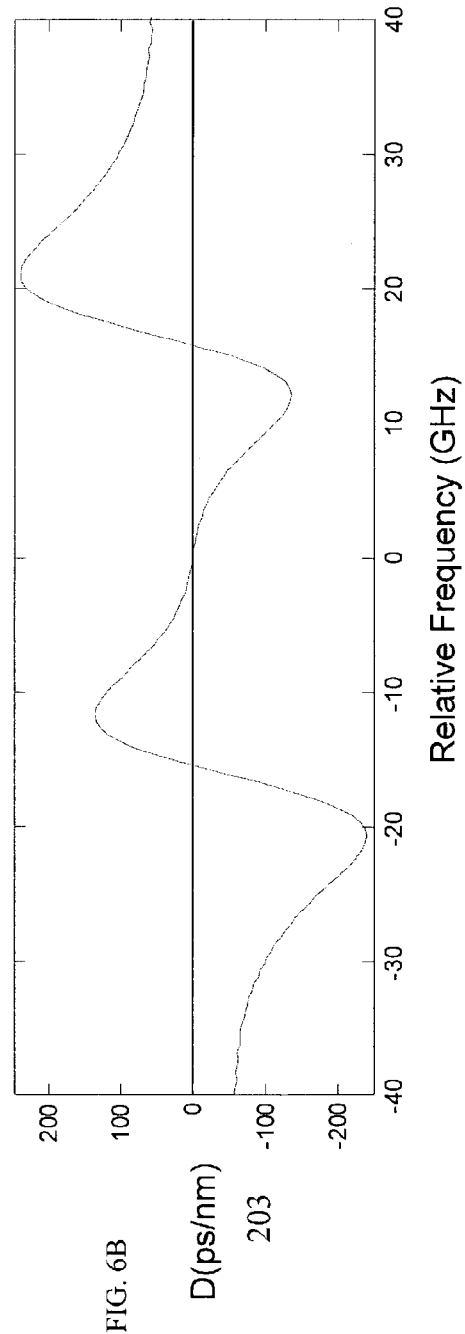
FIG. 6B illustrates the corresponding dispersion of the CMC filter in FIG. 6A versus the optical frequency.

FIG. 5 illustrates a discriminator 106 that may be used in a reflection mode rather than in a transmissive mode as discussed in FIGS. 2 and 3. FIGS. 6A and 6B illustrate an optical signal 141 on a negative slope 142 in a reflective mode of the discriminator. In this configuration, the output 132 from FIG. 4 may be inverted relative to the input before the discriminator 106. As illustrated in FIG. 6B, the spectral position of the input signal relative to the discriminator in a reflective mode may experience a greater negative dispersion than in the transmission mode. Accordingly, the reflection mode may provide for larger dispersion compensation than in the transmission mode.

Figure 6C:
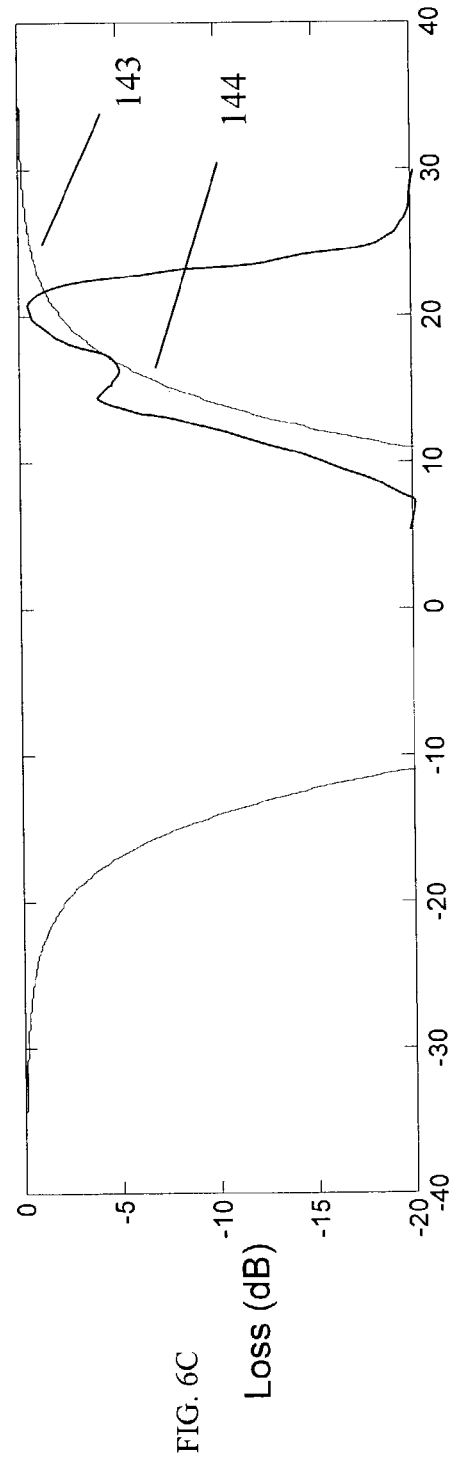
FIG. 6C illustrates optical signals on a positive slope of a reflection side of a CMC filter.
Figure 6D:
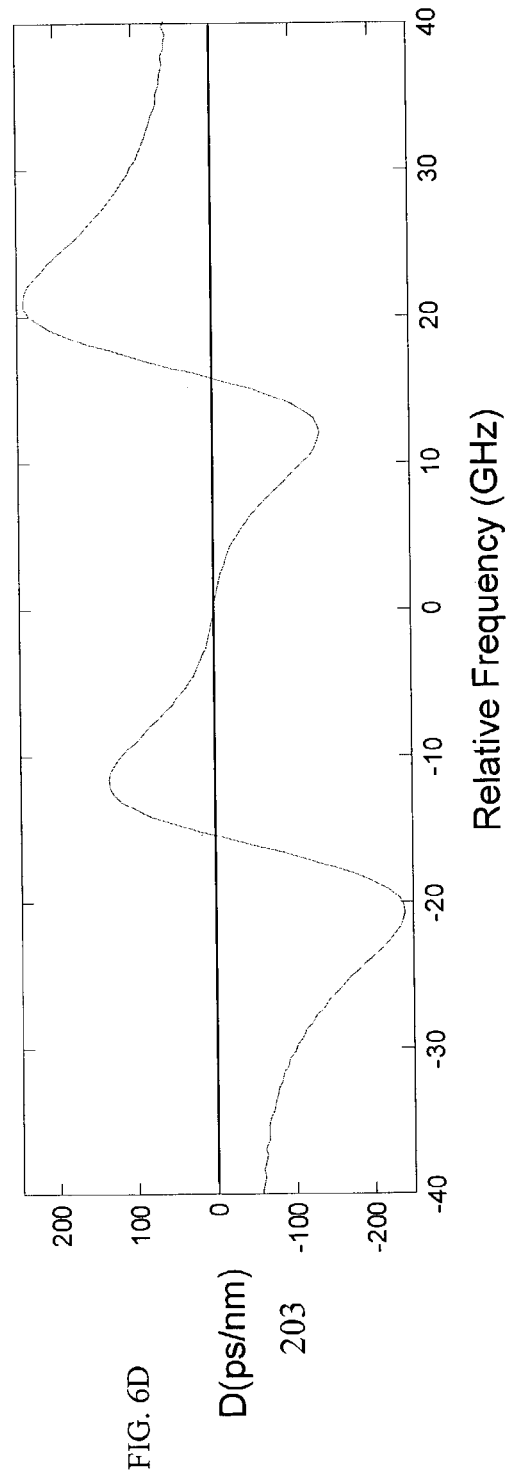
FIG. 6D illustrates the corresponding dispersion of the CMC filter in FIG. 6C versus the optical frequency.

FIGS. 6C and 6D illustrate an optical signal 143 on the positive slope 144 of the reflection mode of the discriminator. Here, the output 130 (FIG. 4) after the discriminator is not inverted relative to the input. The spectral position of the signal relative to the discriminator is such that the reflected portion may experience a greater positive dispersion than in the transmission mode. In the reflective mode, the discriminator may at least partially compensate for the dispersion in the transmission fiber having net negative dispersion.

Figures 7A, 7B:
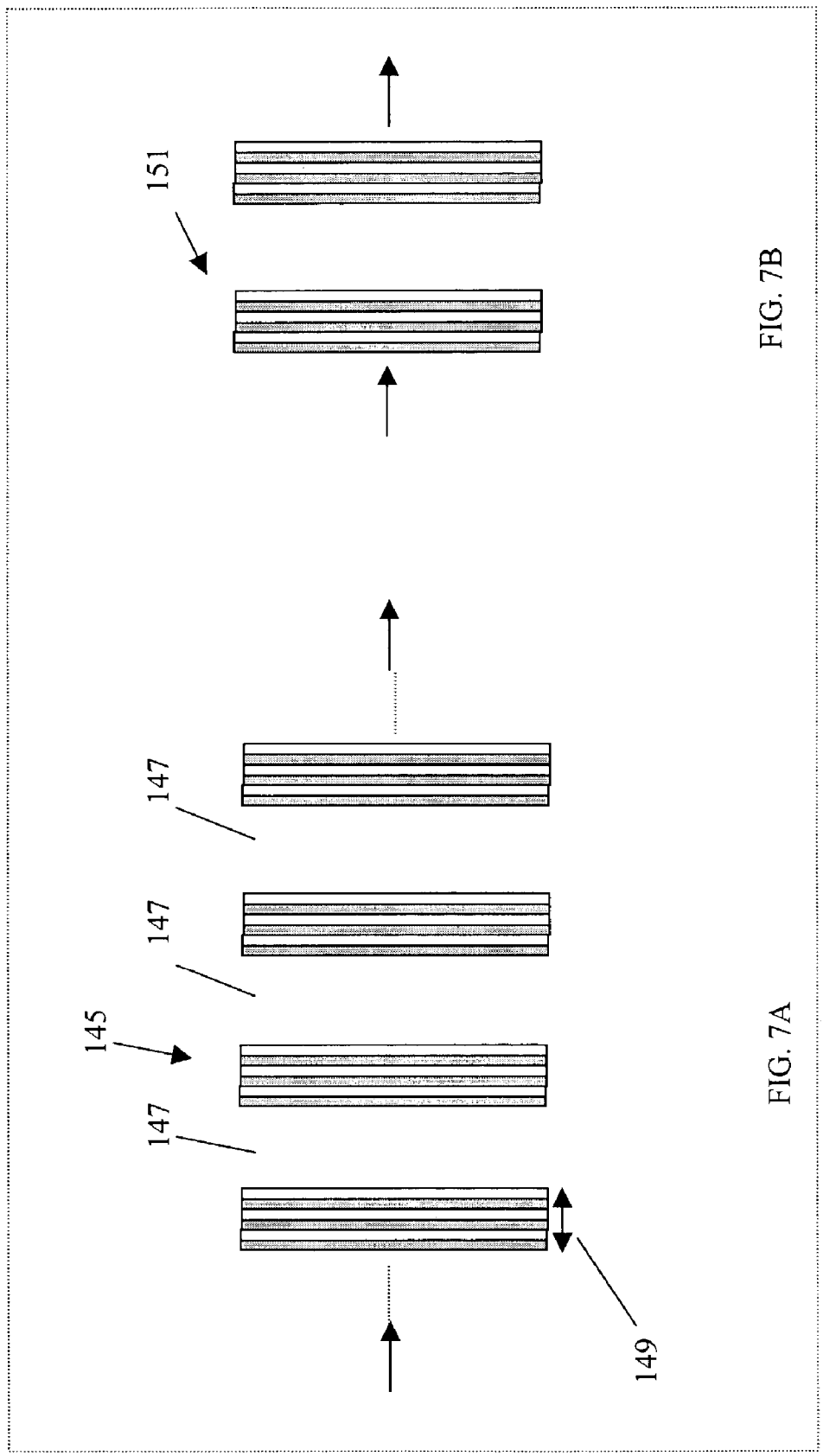
FIG. 7A illustrates a structure of a CMC filter.
FIG. 7B illustrates a structure of a Fabry-Perot filter.

There are a variety of filters that may be used as a discriminator. For example, the discriminator 106 may be a thin film discriminator that can operate with a FM modulated source at high bit rates with minimal sensitivity to temperature changes. FIG. 7A illustrates a coupled multi-cavity (CMC) filter 145 that may be used as the discriminator 106 in the optical system 100. FIG. 7B shows the structure of a single cavity filter, which forms a Fabry-Perot. The CMC may be formed by depositing a plurality of thin layers of two materials, such as $Ta_2O_5$ and $SiO_2$, having refractive indices, $n_H$, and $n_L$, where $n_H > n_L$. The plurality of thin layers of high and low indices may be deposited onto a substrate for support. The substrate may be a variety of materials such as glass. When light impinges on the thin layers, the light at least partially reflects from the interfaces. The interference between these partial reflections produces the desired frequency dependent transmission. The thickness of the thin layers may be adjusted to adjust the slope of the positive and negative transmission edges and the bandwidth.

The CMC may be made of a plurality of cavities 147 formed by a spacer layer between two multilayer mirrors. Each mirror may be formed by a quarter wave stack (QWS), a stack of alternating layers of high and low index materials, where the optical thickness 149 of the layers may be equal to or about an odd integer multiple of ¼ of the design wavelength in that material. The cavities 147 may be either high index or low index material and may be equal to an integer multiple of ½ wavelength thick. In addition, the high and low index materials that form the CMC may have a low thermal expansion coefficient to reduce the sensitivity of the resulting transmission spectrum to temperature variations in the CMC.

A single cavity within the CMC may have the same filter response as a Fabry-Perot filter 151 as illustrated in FIG. 7B with a large free spectral range on the order of about 100 nm. With multiple cavities in the CMC, the transmission edges become steeper, while the bandwidth increases to form a flat-top shape with sharp slopes as illustrated in FIGS. 3A-3D. As a result, the CMC has sharper skirts and a wider bandwidth for high bit rate applications. The number of cavities in the CMC may be adjusted depending on the application to obtain the desired combination of sharp slope and high dispersion compensation for the signal pass band. Increasing the number of the interfering single cavity filters increases the slope of the positive and negative transmission edges and the bandwidth. The thickness of the layers, and the material of choice for the cavities may be also modified to optimize the design. The temperature sensitivity of the CMC may be adjusted by the choice of the cavity material and substrate. Choosing a material with a low thermal expansion coefficient (TEC) for the cavity produces a CMC with reduced temperature sensitivity, while choosing a material with high TEC makes the CMC more sensitive to temperature.

Figure 8:
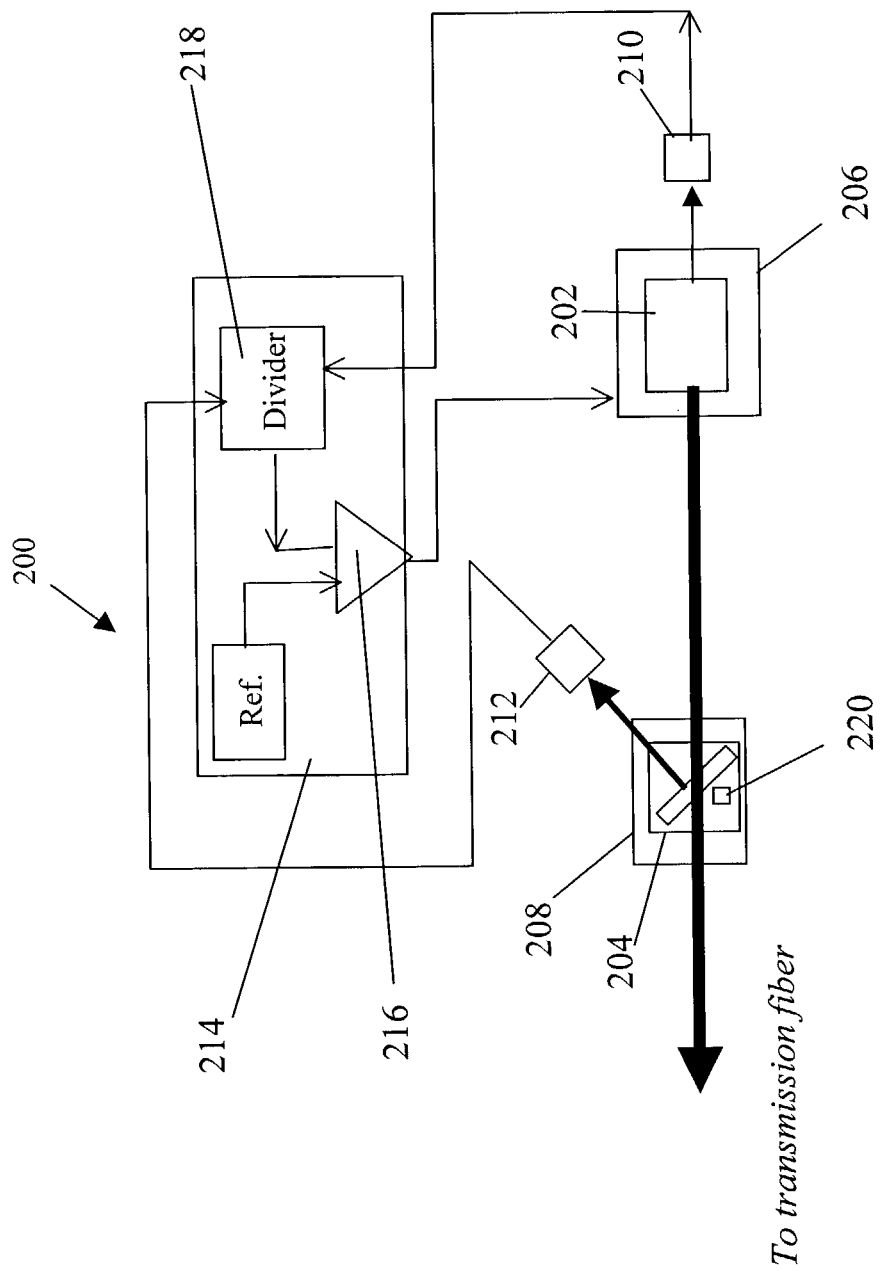
FIG. 8 illustrates a laser optic system including a circuit for locking laser wavelength to the edge of a transmission type optical discriminator.

FIG. 8 illustrates a wavelength-locking system 200 where a discriminator may be used to simultaneously lock the wavelength of the laser diode. The laser 202 and the discriminator 204 may be mounted on separate thermoelectric coolers (TECs) 206 and 208, respectively. A photodiode 210 may monitor the optical power at the back facet of the laser 202, and a photodiode 212 may monitor the optical power reflected from the discriminator 204. The wavelength-locking system 200 may also include a wavelength locking circuit 214 having a comparator 216 communicatively coupled to a divider 218 that compares the ratio of the signals from the two photodiodes 210 and 212. The divider 218 may compare the ratio of the dispersion in the fiber $PD_{filter}$ 212 to the dispersion in the laser $PD_{laser}$ 210, where the ratio $r=P_{reflected}/P_{Laser}$ which may be a substantially fixed set value. The error signal produced in this way may then control the laser TEC 206 to adjust the laser temperature and therefore shift the laser wavelength in order to keep r substantially constant. To avoid wavelength drift, the temperature of the discriminator 204 may be held substantially constant by the thermoelectric cooler 208, and the corresponding temperature sensors 220.

Figure 9:
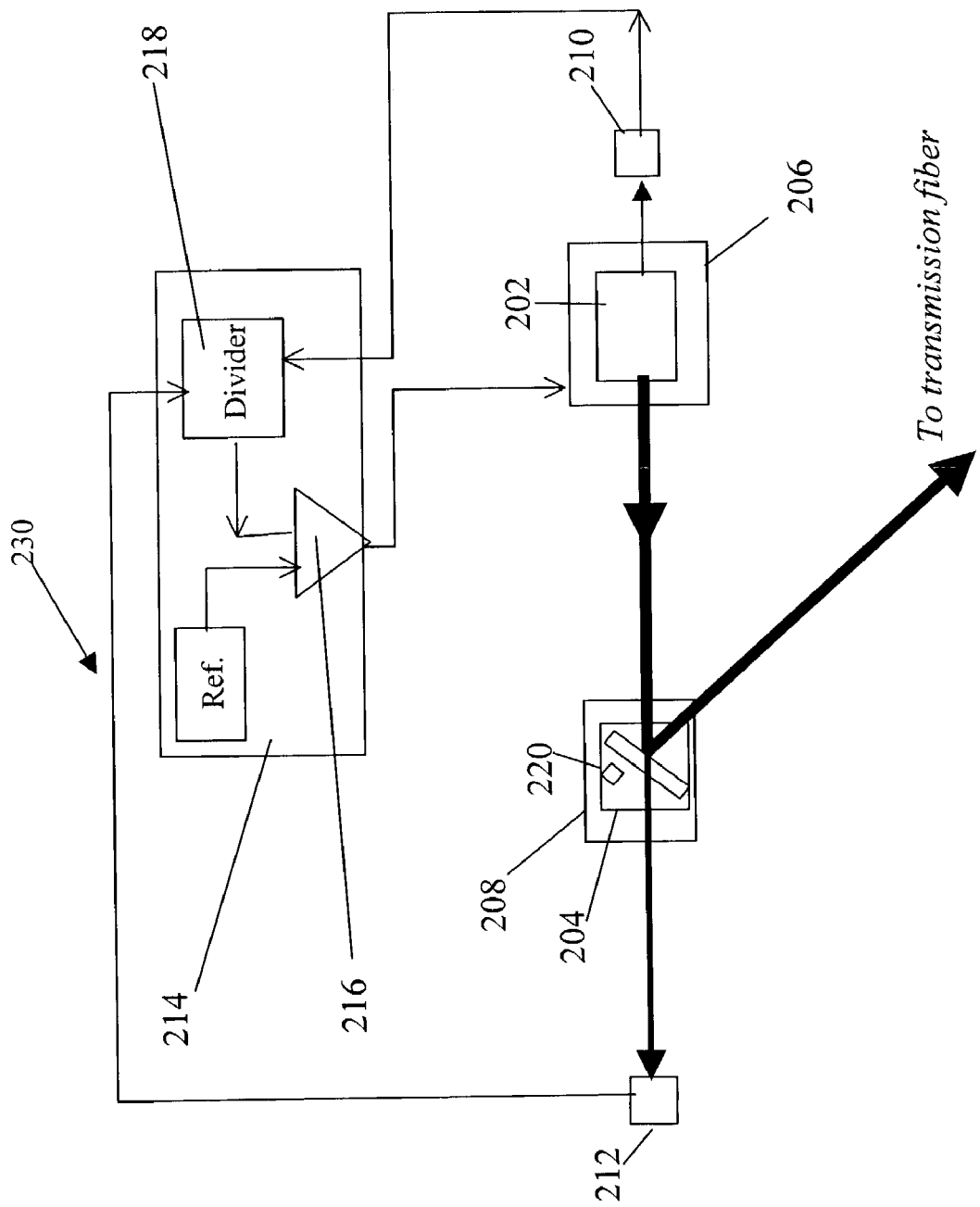
FIG. 9 illustrates a laser optic system including a circuit for locking laser wavelength to edge of a reflection type optical discriminator.

FIG. 9 illustrates another wave locking system 230 capable of locking the laser wavelength to the edge of the discriminator by operating the photodiode 212 in the transmissive side of the discriminator 204. As such, the circuit 214 may now measure the portion of the optical power or signal that has been transmitted through the discriminator 204 using the detector 212 on the transmission side of the discriminator 204. The divider 218 within the circuit 214 may compare the ratio of the dispersion in the fiber $PD_{transmissive}$ 212 to the dispersion in the laser $PD_{laser}$ 210, to hold the ratio $r=P_{transmissve}/P_{Laser}$ in a substantially fixed set value.

Figure 10:
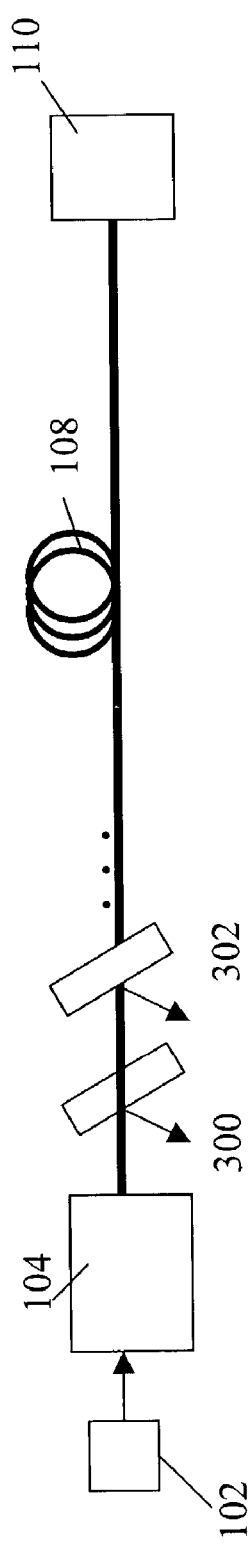
FIG. 10 illustrates a fiber optic system including a directly FM modulated laser, and a cascade of transmission type optical discriminators having a total dispersion that has opposite sign to the dispersion of the transmission fiber.

FIG. 10 illustrates cascading a plurality of non-interfering CMCs, such as a first CMC 300 and a second CMC 302, to obtain a desirable filter characteristic. The transmission function $H(\Omega)$ of such cascading filters may be expressed as a function of frequency $\Omega$, which is the product of the transmission function of the individual filters. The dispersion of the cascading filters is the sum of the dispersions of the individual filters. Accordingly, the sum of the dispersions of the cascading filters may be predetermined or designed to have the opposite sign of the dispersion of the transmission fiber at the operational wavelength.

Cascading filters to obtain a desirable dispersion that is opposite of the dispersion in the fiber may offer flexibility in designing a discriminator with the desirable characteristics. For example, filters with sharp slopes may require expanded optical beams so that the constituent spatial wavelets of the incident beam are substantially incident at the same angle. Typical laser beams with a finite spatial profile, such as a guassian, include plane waves having a distribution of wavevectors that have an angular distribution. This angular distribution may be determined by the spatial Fourier transform of the beam. With the characteristics of the filter changing slightly as a function of incident angle, the transmission of a beam of finite spatial extent through a filter with sharp spectral features may produce a response that may broaden relative to the ideal case. This unwanted broadening may be voided by producing the desired filter function with sharp slopes by cascading filters with smaller slopes.

Figure 11:
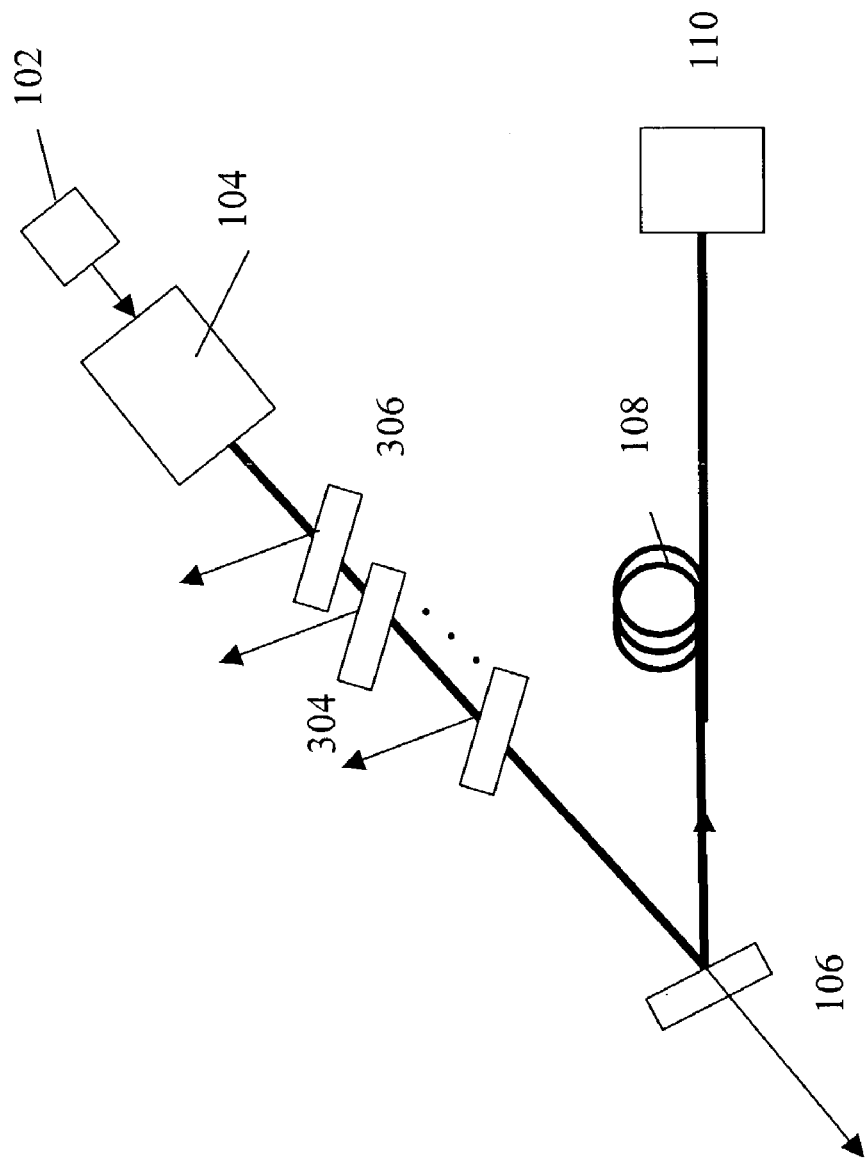
FIG. 11 illustrates a fiber optic system including a directly FM modulated laser, and a cascade of reflection type optical discriminators having a total dispersion that has opposite sign to the dispersion of the transmission fiber.

FIG. 11 illustrates a plurality of cascading transmission filters, such as first and second filters 304 and 306, for producing optical discrimination, and a separate reflective type device, such as a Gire-Toumois interferometer 106, for dispersion compensation. The cascading transmission filters may be optimized for their amplitude response, and the reflective filter may be optimized for dispersion compensation. The optical discriminator may be also a multicavity thin film filter where change in temperature does not substantially change the optical spectrum. With the multicavity thin film filter, temperature stabilization of the filter may not be necessary.

Optical transmitters may need to operate within a range of temperatures, such as 0-80° C., to have minimal degradation in their output of optical waveforms. The wavelength of a semiconductor distributed feed-back (DFB) laser may change rapidly with increasing temperature, typically at a rate of $d\lambda/dT$ in about 0.1 nm/C. As discussed above in FIGS. 3A-3D, 6A, and 6D, the point of operation needs to remain substantially fixed as a function of temperature. The point of operation is the spectral position of the frequency modulated signal 136, 138, 141, or 144 incident on the discriminator relative to the peak transmission of the discriminator. For example, the optimum point may be the spectral position of the signal that produces a 3 dB loss after passing through the discriminator. The locking circuit illustrated in FIGS. 8 and 9 substantially accomplishes this objective with the addition of circuitry and TEC. In low cost applications, the thermoelectric cooler associated with the DFB laser may be eliminated. In such a case, the multicavity thin film filter or other discriminator may be predetermined so that it has the same coefficient of thermal drift $d\lambda/dT$ as that of the DFB laser. This may eliminate the need for TECs and corresponding control circuits, and keep the laser wavelength substantially fixed relative to the transmission edge of the filter.

What is claimed is:

1. A fiber optic transmission system, comprising:
   an optical signal source adapted to produce a partially frequency modulated signal; and
   a coupled multi-cavity (CMC) filter adapted to convert the partially frequency modulated signal into a substantially amplitude modulated signal;
   a transmission fiber having a dispersion, where the CMC filter is adapted to compensate for at least a portion of the dispersion in the transmission fiber; and
   a cascade of CMC filters having a total dispersion to compensate for at least a portion of the dispersion in the transmission fiber.

2. The system according to claim 1, where the CMC filter has a plurality of thin layers of alternating first and second materials deposited onto a substrate, where the first material has a higher refractive index than the second material.

3. The system according to claim 2, where the thin layers have an optical thickness of about an odd multiple of ¼ of wavelengths of the frequency modulated signal in that material.

4. The system according to claim 2, where the first material is $Ta_2O_5$ and the second material is $SiO_2$.

5. The system according to claim 1, where the CMC filter has a plurality of cavities each formed by a spacer layer between two multilayer mirrors that are formed from stacks of alternating layers of high and low index materials.

6. The system according to claim 5, where the alternating layers of high and low index material have a thickness that is an odd integer multiple of ¼ wavelength of the frequency modulated signal in that material.

7. The system according to claim 5, where each spacer layer has thickness that is an integer multiple of ½ wavelengths of the frequency modulated signal in that material.

8. The system according to claim 5, where the spacer layer has a low thermal expansion coefficient for the plurality of cavities to reduce temperature sensitivity of the CMC filter.

9. The system according to claim 1, where the CMC filter provides a positive transmission edge slope and a negative transmission edge slope and a bandwidth.

10. The system according to claim 9, where the CMC filter is formed from a plurality of interfering single cavity filters where increasing the number of the interfering single cavity filters increases the slope of the positive and negative transmission edges and the bandwidth.

11. The system according to claim 10, where the CMC filter is formed from a number of alternating first and second materials to form the plurality of interfering single cavity filters, where the first material has a higher refractive indices than the second material.

12. The system according to claim 11, where the first and second materials are formed from thin layers, where the thickness and number of layers are adjusted to adjust the slope of the positive and negative transmission edges and the bandwidth.

13. A fiber optic transmission system, comprising:
an optical signal source adapted to produce a partially frequency modulated signal;
a coupled multi-cavity (CMC) filter having a dispersion $D_d$ and adapted to convert the partially frequency modulated signal into a substantially amplitude modulated signal; and a transmission fiber having a dispersion $D_f$, where the dispersion $D_d$ has the opposite sign to $D_f$.

14. The system according to claim 13, where the CMC filter has a plurality of thin layers of alternating first and second materials deposited onto a substrate, where the first material has a higher refractive index than the second material.

15. The system according to claim 14, where the thin layers have an optical thickness of about an odd integer multiple of ¼ of wavelengths of the frequency modulated signal in that material.

16. The system according to claim 14, where the first material is $Ta_2O_5$ and the second material is $SiO_2$.

17. The system according to claim 13, where the CMC filter has a plurality of cavities each formed by a spacer layer between two multilayer mirrors that are formed from stacks of alternating layers of high and low index materials.

18. The system according to claim 17, where the spacer layer has thickness that is an integer multiple of ½ wavelengths of the frequency modulated signal.

19. The system according to claim 17, where the spacer layer has a low thermal expansion coefficient for the plurality of cavities to reduce temperature sensitivity of the CMC filter.

20. The system according to claim 13, including a cascade of CMC filters having a total dispersion to compensate for at least a portion of the dispersion $D_f$.

21. The fiber optic system according to claim 13, where the CMC filter provides a positive transmission edge slope and a negative transmission edge slope and a bandwidth.

22. The fiber optic system according to claim 21, where the CMC filter is formed from a plurality of interfering single cavity filters where increasing the number of the interfering single cavity filters increases the slope of the positive and negative transmission edges and the bandwidth.

23. The fiber optic system according to claim 22, where the CMC filter is formed from alternating first and second materials to form the plurality of interfering single cavity filters, where the first material has a higher refractive indices than the second material.

24. The method according to claim 23, where the first and second materials are formed from thin layers, each having a thickness that is adjusted to adjust the slope of the positive and negative transmission edges and the bandwidth.

25. A fiber optic transmission system, comprising:
an optical signal source;
a modulator coupled to the optical signal source and configured to cause the optical signal source to emit a frequency modulated signal comprising high frequency portions and low frequency portions encoding data symbols;
a coupled multi-cavity (CMC) filter having a dispersion $D_d$, the CMC filter positioned to receive the frequency modulated signal and having a transmission function effective to cause the filter to output a filtered signal wherein one of the high frequency portions and low frequency portions is less attenuated relative to the other of the high frequency portions and low frequency portions;
a fiber positioned to receive the filtered signal, the fiber having a dispersion $D_f$, wherein $D_d$ has a sign opposite $D_f$ in a frequency range including a frequency of whichever of the high frequency portions and low frequency portions that is less attenuated by the CMC filter.

26. The fiber optic transmission system of claim 25, wherein, the CMC filter has a transmission function having positive slope transmission edges and negative slope transmission edges; wherein $D_d$ is negative on a low frequency side of the positive slope transmission edges and the negative slope transmission edges; wherein $D_d$ is positive on a high frequency side of the positive slope transmission edges and the negative slope transmission edges.

27. The fiber optic transmission system of claim 26, wherein $D_f$ is negative and one of the positive slope transmission edge is located between the frequencies of the low frequency portions and high frequency portions.

28. The fiber optic transmission system of claim 26, wherein $D_f$ is negative and one of the positive slope transmission edge is located between the frequencies of the low frequency portions and high frequency portions.

29. The fiber optic transmission system of claim 25, wherein the CMC filter is a first CMC filter, and wherein a plurality of additional CMC filters positioned optically between the optical source and the fiber, each of the additional CMC filters having dispersion $D_d$ having a sign opposite $D_f$.

30. The fiber optic transmission system of claim 29, further comprising a reflective filter positioned to receive the filtered signal.

31. The fiber optic transmission system of claim 30, wherein the reflective filter is a Gire-Tournois interferometer having dispersion $D_g$ that has a sign opposite $D_f$.

32. The fiber optic transmission system of claim 25, wherein the filtered output is reflected from the CMC filter.

33. A method for transmitting optical signals comprising:
modulating a laser to generate a frequency modulated signal having low frequency and high frequency portions encoding data symbols;
filtering the frequency modulated signal with a coupled multi-cavity (CMC) filter having dispersion $D_d$ and outputting a filtered signal wherein one of the low frequency portions and high frequency portions is relatively less attenuated; and
transmitting the filtered signal through an optical fiber having dispersion $D_f$;
wherein $D_d$ has a sign opposite $D_f$ in a frequency range including a frequency of whichever of the high frequency portions and low frequency portions that is less attenuated by the CMC filter.

34. The method of claim 33, wherein which ever of the low frequency and high frequency portions that is less attenuated experiences dispersion $D_{d1}$ from interaction with the CMC filter and the other of the low frequency and high frequency portions experiences dispersion $D_{d2}$ from interaction with the CMC filter, wherein $D_{d2}$ has the same sign as dispersion $D_f$ and $D_{d1}$ has a sign opposite $D_f$.

35. The method of claim 33, wherein, the CMC filter has a transmission function having positive slope transmission edges and negative slope transmission edges; wherein $D_d$ is negative on a low frequency side of the positive slope transmission edges and the negative slope transmission edges; wherein $D_d$ is positive on a high frequency side of the positive slope transmission edges and the negative slope transmission edges.

36. The method of claim 35, wherein $D_f$ is negative and one of the positive slope transmission edge is located between the frequencies of the low frequency portions and high frequency portions.

37. The method of claim 35, wherein $D_f$ is negative and one of the positive slope transmission edge is located between the frequencies of the low frequency portions and high frequency portions.

38. The method of claim 33, wherein the CMC filter is a first CMC filter, and wherein a plurality of additional CMC filters positioned optically between the optical source and the fiber, each of the additional CMC filters having dispersion $D_d$ having a sign opposite $D_f$, the method further comprising transmitting the filtered signal through the additional CMC filters.

39. The method of claim 38, further comprising reflecting the filtered signal from a reflective filter.

40. The method of claim 39, wherein the reflective filter is a Gire-Tournois interferometer having dispersion $D_g$ that has a sign opposite $D_f$.

41. The method of claim 33, wherein filtering the frequency modulated signal with the CMC filter comprises reflecting the frequency modulated from the CMC filter.

\* \* \* \* \*